July 7, 1931. H. E. SPENCER 1,813,683
PNEUMATIC GEAR SHIFT
Filed Feb. 25, 1929  8 Sheets-Sheet 7

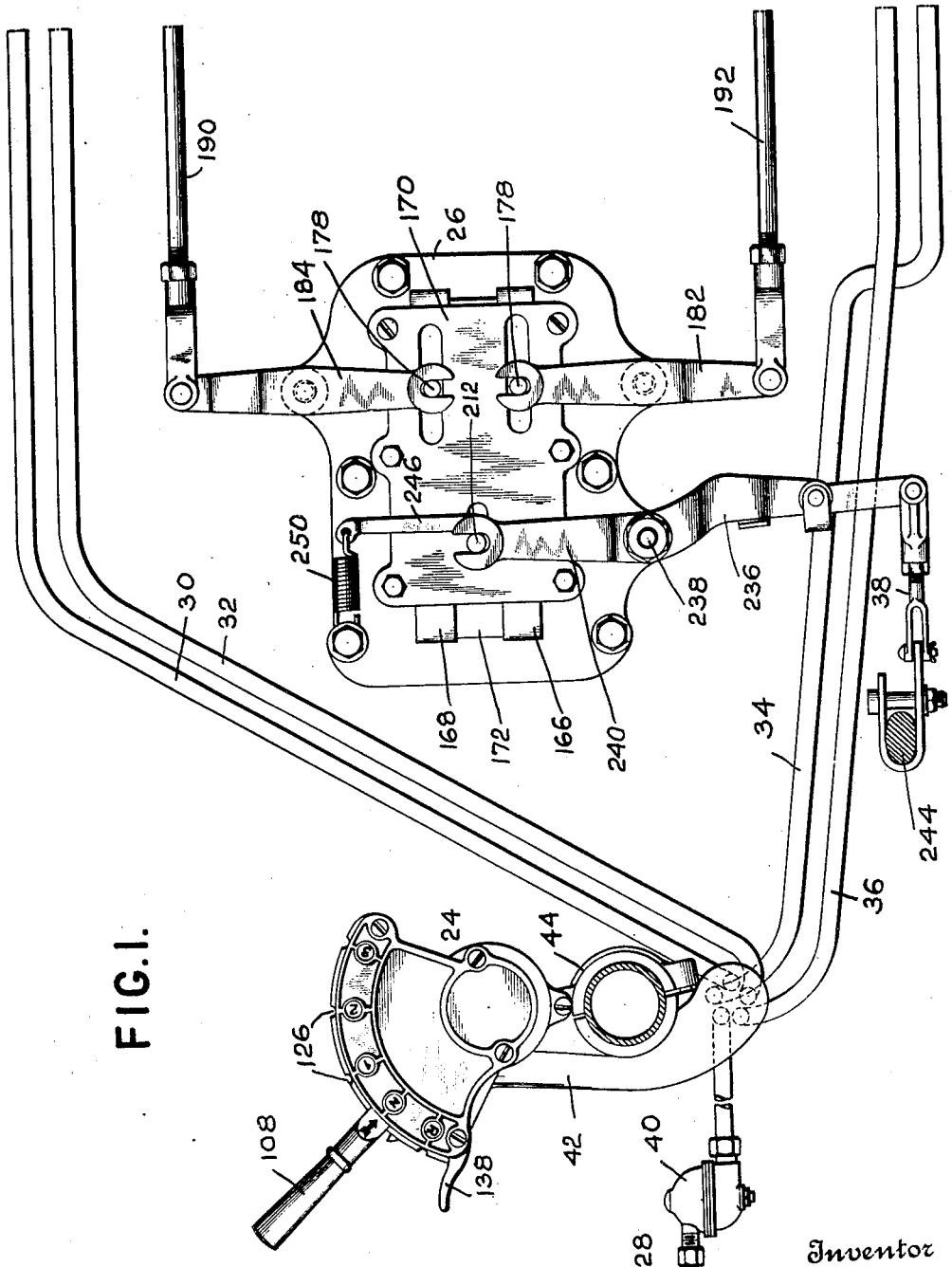

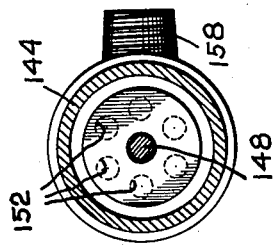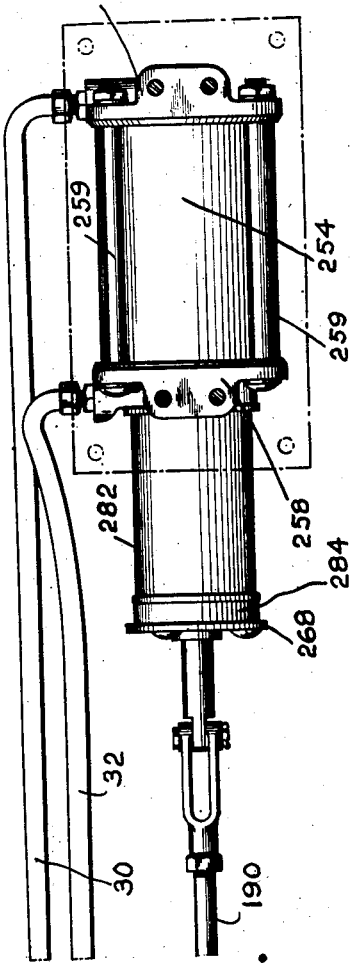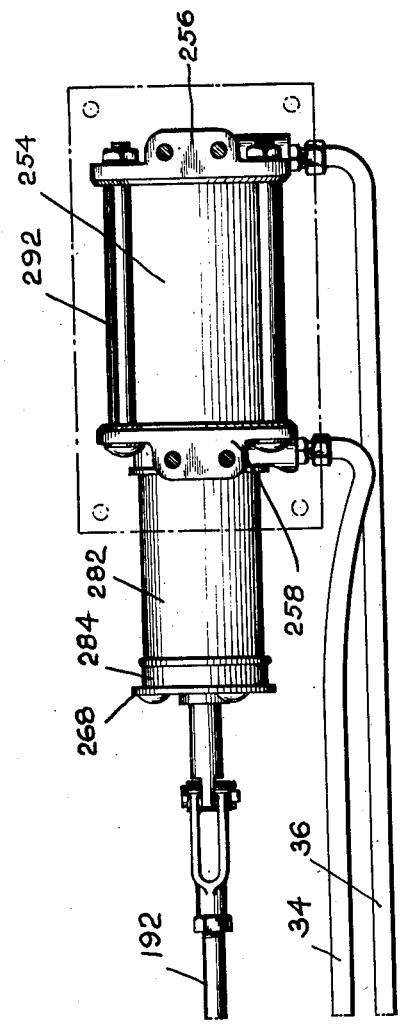

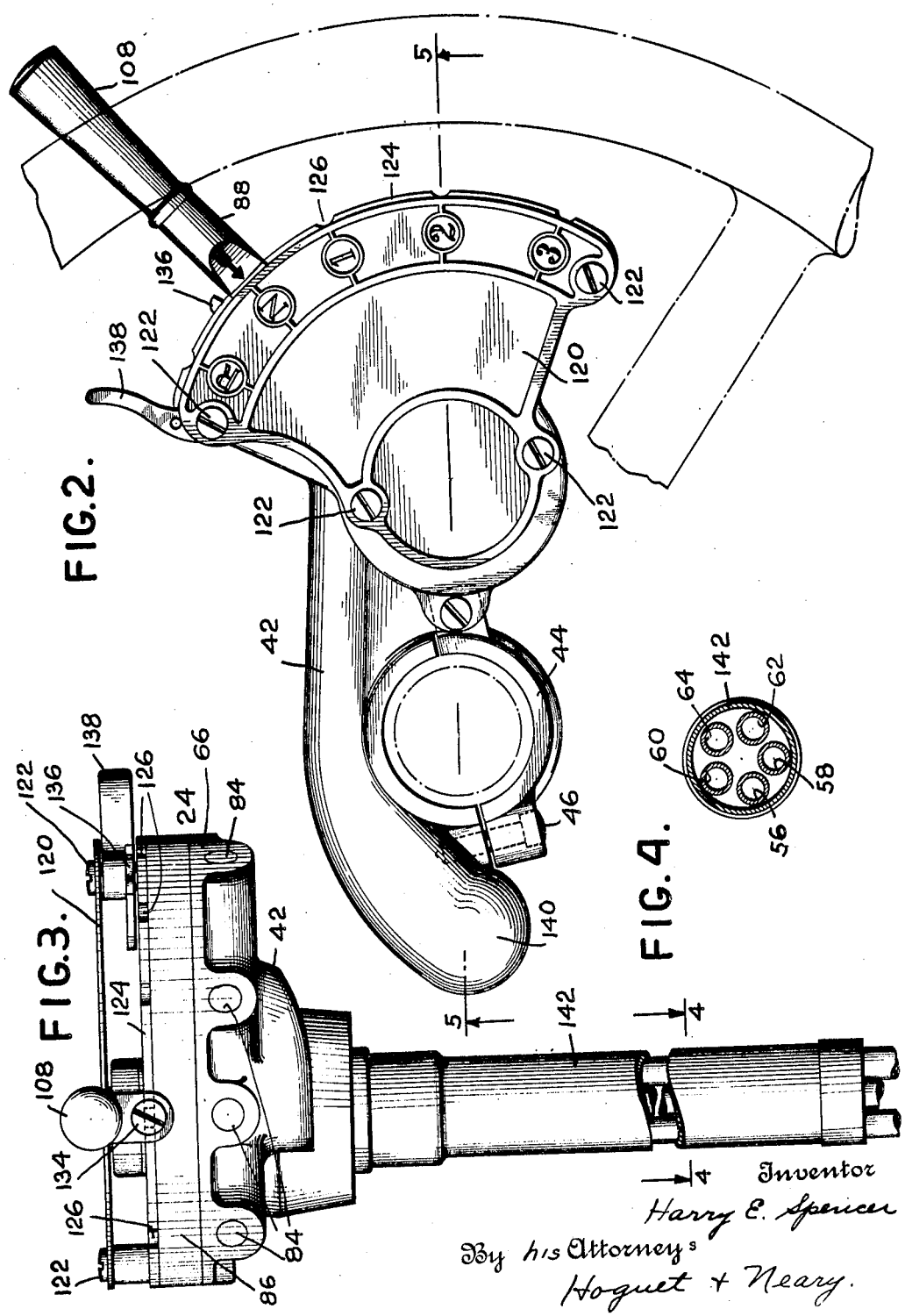

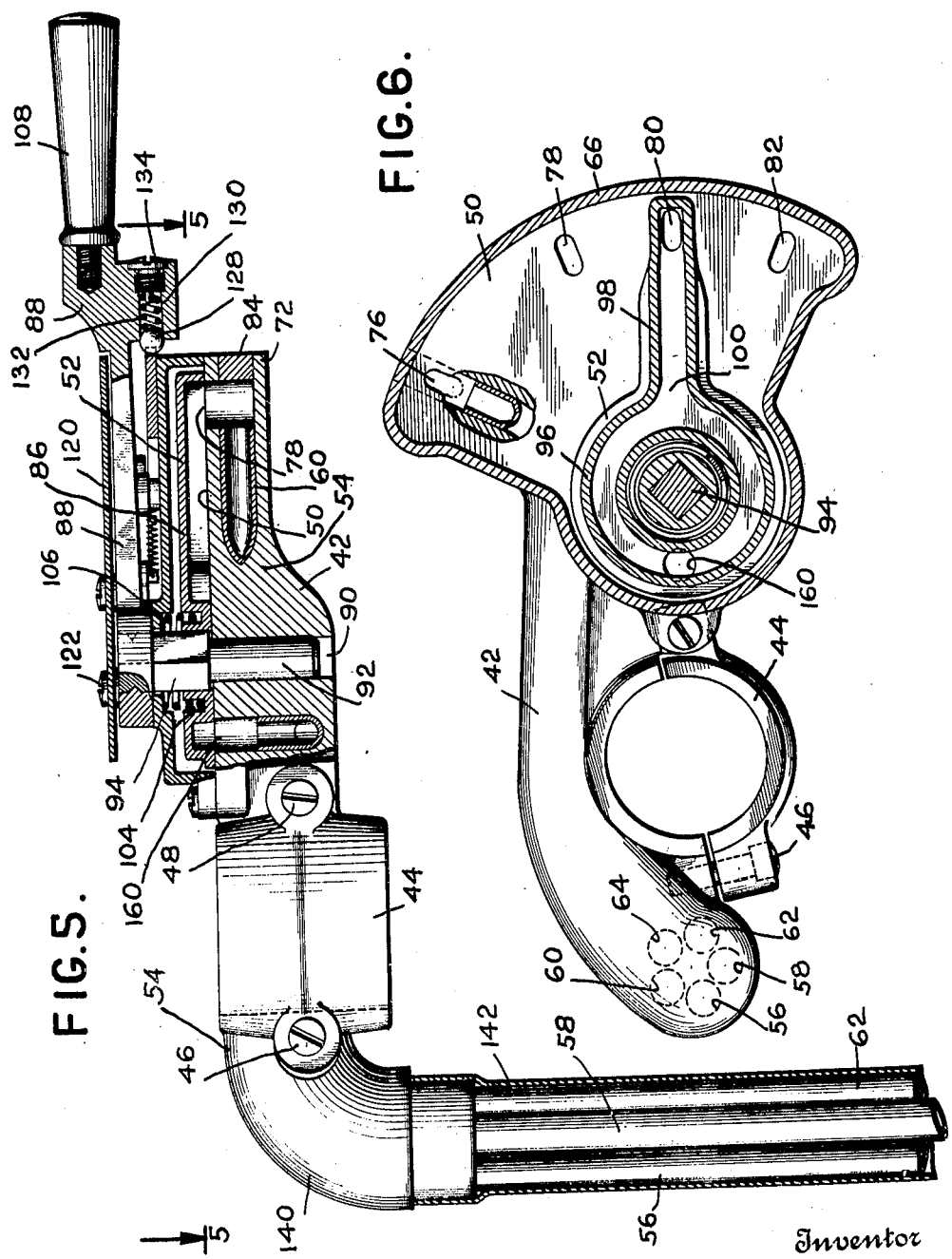

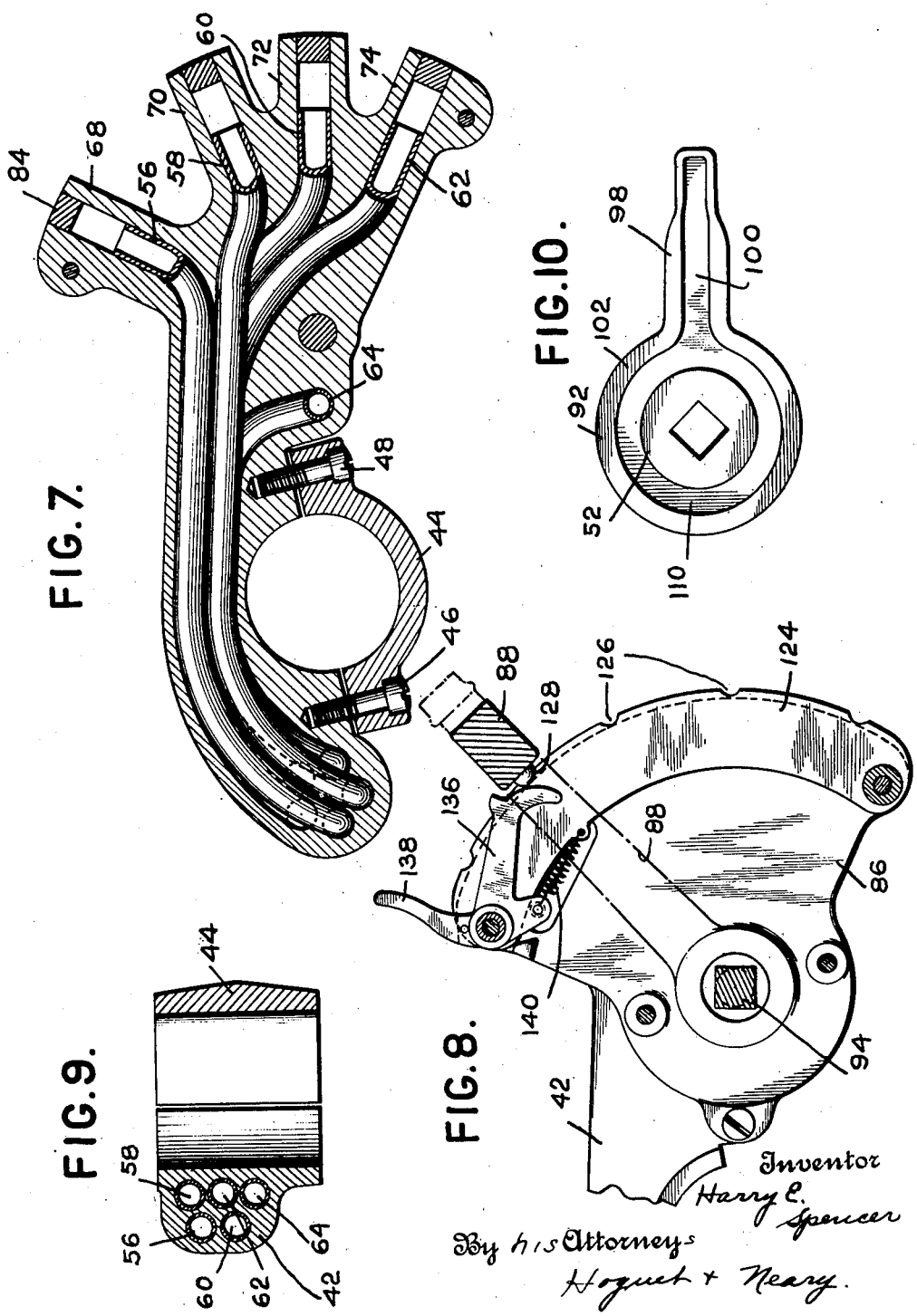

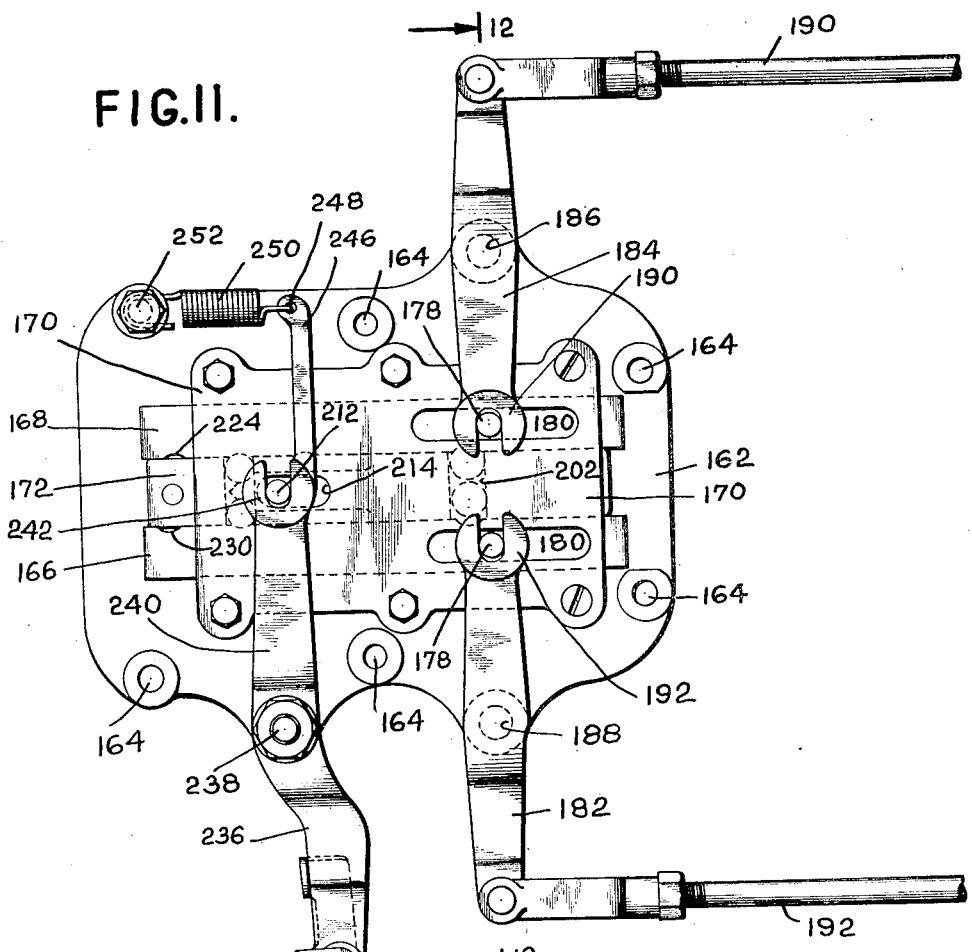
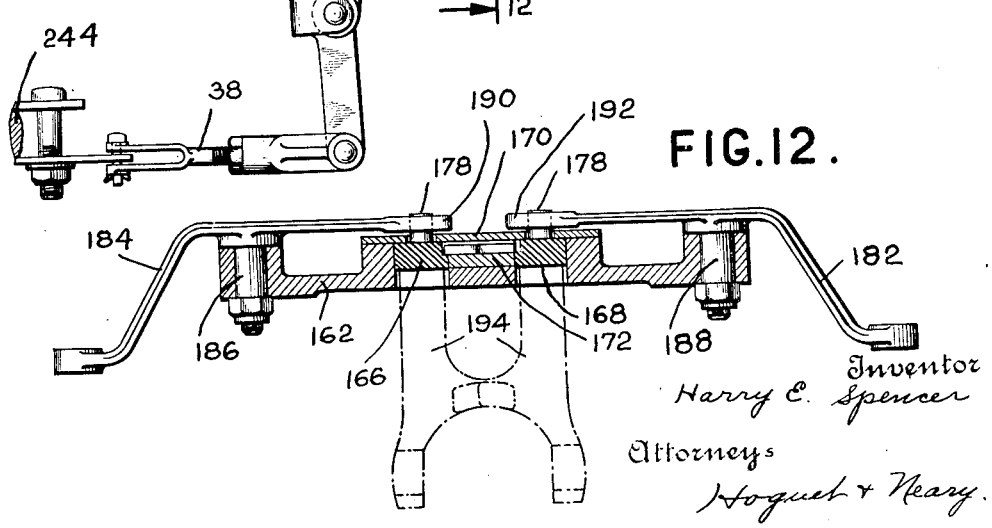

Inventor
Harry E. Spencer
By his Attorneys
Hoguet + Neary.

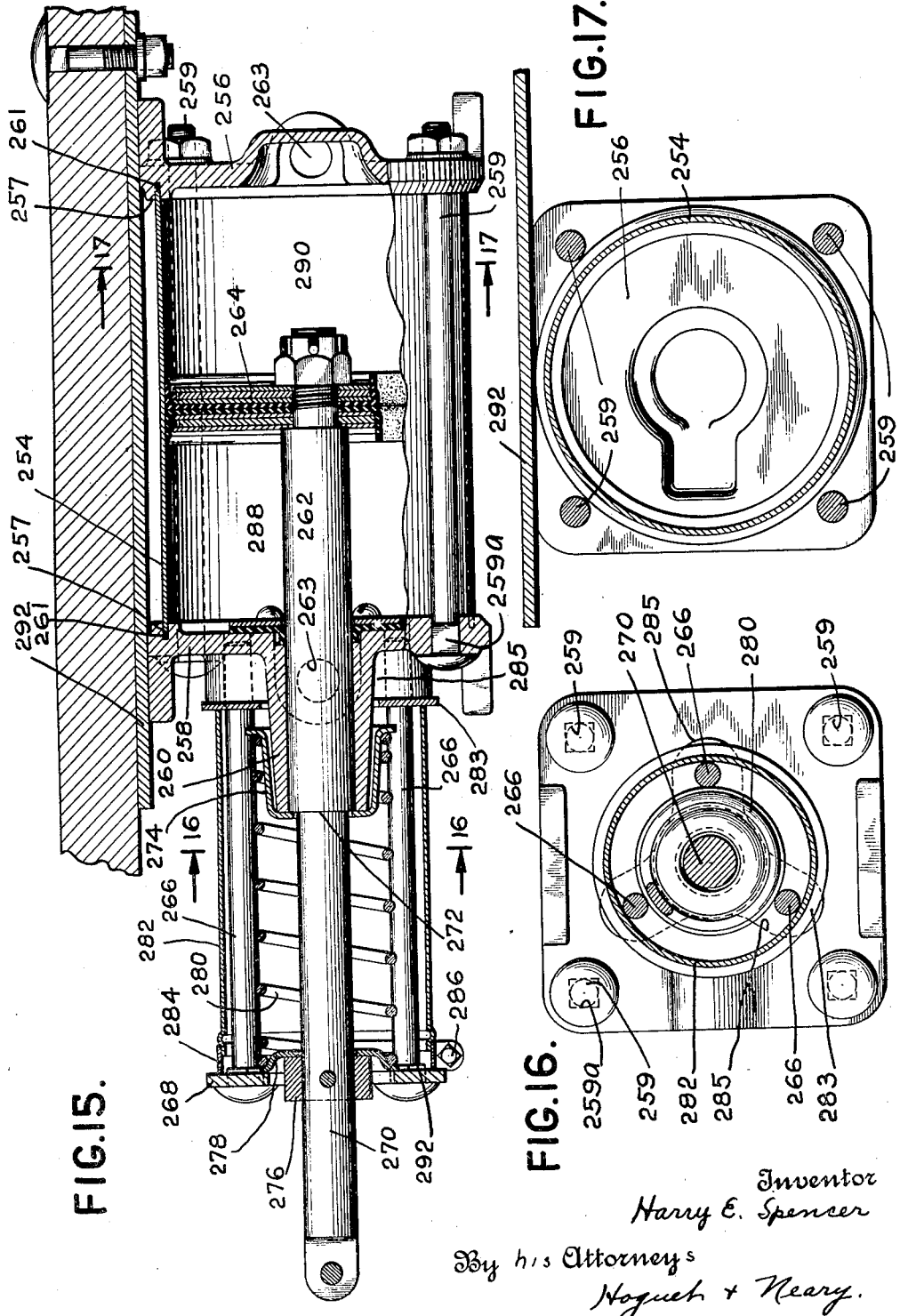

UNITED STATES PATENT OFFICE

HARRY E. SPENCER, OF NEW HAVEN, CONNECTICUT, ASSIGNOR TO UNIVERSAL GEAR SHIFT CORPORATION, OF NEW YORK, N. Y., A CORPORATION OF DELAWARE

PNEUMATIC GEAR SHIFT

Application filed February 25, 1929. Serial No. 342,685.

This invention relates in general to pneumatic gear shifts, and in particular to vacuum gear shifts which may be operated from an automobile engine manifold.

It is the object of my invention to provide a novel type of vacuum or pneumatic mechanism for automatically shifting the gears of an automobile.

Another object is to provide a gear shift mechanism in which the apparatus will be operative under conditions heretofore impossible.

A further object is to provide a gear shift mechanism, with improved construction that avoids mechanical defects found in previous systems.

Other objects of the invention will appear as the description proceeds.

My invention can best be understood from the following description, taken in conjunction with the accompanying drawings, in which like reference characters throughout denote similar elements, and in which:

Fig. 1 is a schematic view showing the layout of a part of the apparatus;

Fig. 1A is an extension of Fig. 1, showing, together with it, a complete layout of the units forming my improved gear shift, together with the necessary piping and clutch connection.

Fig. 2 is a top plan view of the hand controlling mechanism, including the valve;

Fig. 3 is a front elevation of the controlling mechanism;

Fig. 4 is a section taken on the lines 4—4 of Fig. 3, looking in the direction of the arrows;

Fig. 5 is a vertical section of the controlling mechanism, taken along the line 5—5 of Fig. 2;

Fig. 6 is a horizontal section taken on line 5—5 of Fig. 5;

Fig. 7 is a plan view, with parts broken away to show the lead pipes in the control mechanism;

Fig. 8 is a detail, partly in section, showing the detent and valve handle mechanism;

Fig. 9 is a vertical cross section taken thru the control mechanism;

Fig. 10 is a plan view of the valve element;

Fig. 11 is a top plan view of the cover plate;

Fig. 12 is a section taken on line 12—12 of Fig. 11;

Fig. 15 is a vertical section taken thru the cylinder;

Fig. 16 is a section taken on line 16—16 of Fig. 15;

Fig. 17 is a section taken on line 17—17 of Fig. 15;

Fig. 18 is a vertical section of the check valve; and

Fig. 19 is a horizontal section taken on line 19—19 of Fig. 18.

Figure 13:
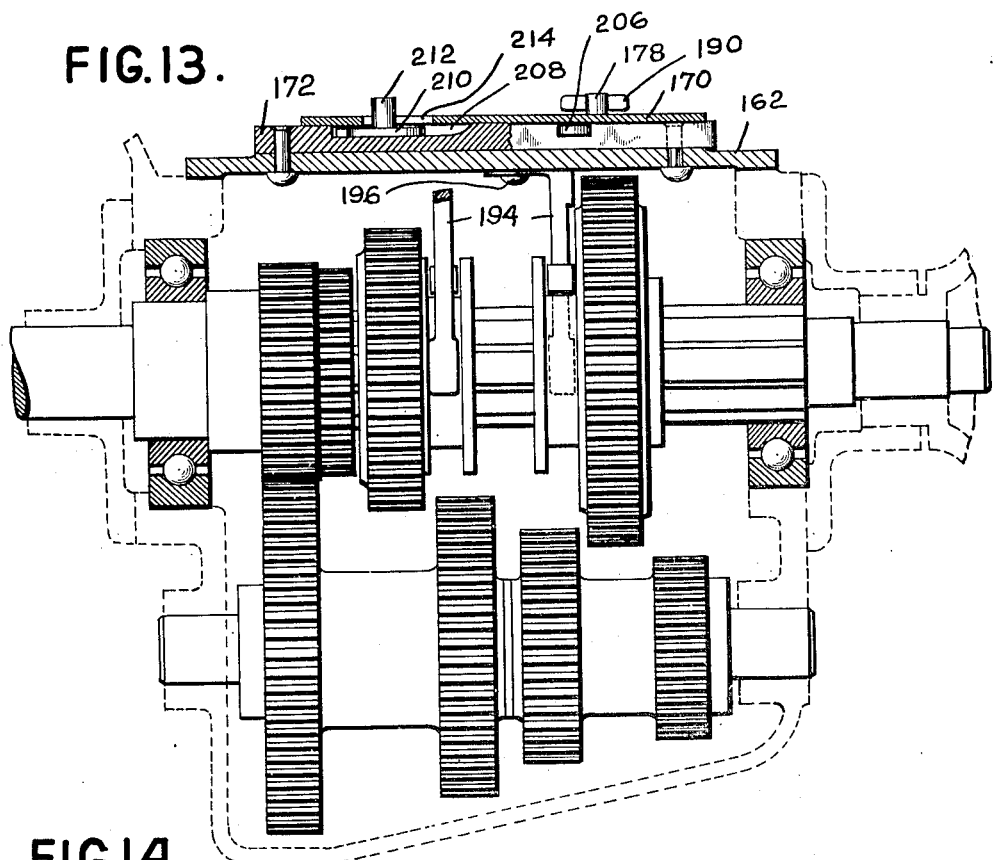
Fig. 13 is an elevation, partly in section, showing a conventional gear box, with the top plate applied.

I have shown in Figs. 1 and 1A the general layout of a vacuum gear shift operating mechanism. This includes a quadrant and valve 24, which are mounted upon the steering post in a manner to be presently described. At 26 is the top or cover plate, to be mounted upon the transmission housing. A line 28 leads from the manifold of the engine, and serves to furnish the pneumatic power, or vacuum to the mechanism. Lines 30, 32, 34, and 36 lead from the control mechanism to the cylinders, as will be seen in Fig. 1A. At 38 I have shown an automatic locking mechanism, operatively connected with the clutch. At 40 I have shown a check valve, cut into the feed line from the manifold, the use of which will be indicated later.

Considering now the valve 24 in more detail, and referring to Figs. 2 to 10 inclusive, I have provided a casing 42, adapted to be clamped upon a steering wheel column by means of clamp 44 and screws 46 and 48.

Casing 42 is provided with a flat top surface 50 upon which rests, in a rotatable manner, valve head 52. In the body 54 of the casing are disposed tubes 56, 58, 60, 62 and 64. The first four of these tubes are brought to the outer edge 66 of casing 42, being housed in projections 68, 70, 72 and 74. Apertures 76, 78, 80 and 82 pierce the top surface 50 of the casing, and register with the outer-most ends of the tubes. These apertures are spaced as far apart as is conveniently practicable. This provides an advantage which is a great improvement over all previous valves of the type, and which will be described a little later. Plugs 84 close the ends of the tubes from the atmosphere.

A top casing 86, covers surface 50, being spaced therefrom, and forming a chamber. Mounted upon cover plate 86 is a control lever 88 which extends thru cover plate 86 and valve head 52 and is rotatably mounted at 90 in the casing 42. This control lever 88 has an operating handle 108. Shaft 92 is squared at 94 to engage valve head 52 in a manner such as to provide rotation of the valve head about the axis of shaft 92.

Valve head 52 comprises a circular body portion 96 and a finger-like extension 98. A deep groove 100 encircles the post 94 and extends out not quite to the extremity of extension 98. The face 102 of the valve head is perfectly flat, and is intended to slide upon face 50 of the lower casing in a practically air-tight manner. A circular depression 104 accommodates a spring 106 which presses against top plate 86, thus assisting in holding the valve head tightly against its seat. It will be seen that manipulation of handle 108 will cause rotation of valve head 52 about the axis of 92, and will thereby bring the groove 100 in extension 98 of this valve, successively into registry with each of the apertures 76, 78, 80 and 82. The circular portion 110 of groove 100 is in constant registry with aperture 160. This aperture opens into vacuum feed line 64 and provides a constant supply of vacuum, which by rotation of the valve head, may be applied thru any desired aperture and consequently to any desired one of pipes 56, 58, 60 or 62, and thence to supply pipes 30, 32, 34 or 36, and their respective operating cylinders.

A quadrant plate 120 is mounted over lever 106 by means of screws 122, and bears on its upper face, the symbols R, N, 1, 2, 3, corresponding, of course, to the usual gear positions of reverse, neutral, first, second and third. By means of handle 108, valve 52 can be placed accurately in the proper position to register with the aperture or port needed to make a particular shift. Directly below each of the aforementioned indices, in the outer edge of plate 124, which surmounts cover plate 86, are depressions 126. These serve to hold a ball 128 which rides in a cylinder 130 and is pushed inward by a spring 132 which, in turn, abuts against a plug nut 134. This mechanism serves to hold lever 108 in any position to which it may be set, but yields readily when a change of gears is desired.

A lock pawl 136 abuts against lever 88, and is adapted to prevent movement of this arm to reverse position. This serves as a safety mechanism to prevent accidental reversal of a moving car with possible stripping of the gears. The lock may be released by pressing with the finger upon extension 138, thus moving lock pawl 136 out of contact with arm 88. A spring 140 holds the mechanism normally in locked position.

Figs. 7 and 9 show most clearly the manner in which the conduits 56, 58, 60, 62 and 64 are led from the valve points. They pass thru casing 54, around the steering post, and to the rear thereof. These conduits may be of any suitable material, such, for example, as copper; and I have found it possible to cast them directly into the casing. Fig. 9 shows them in section. After having been brought to the rear of the steering wheel, the casing and tubes make a right angle bend downward 140. The tubes then leave casing 42, and may, if desired, be surrounded by a tubular casing 142. They may then be led downward thru the floorboard, or may, if preferred be led thru the dash. They then connect to pipes 30, 32, 34 and 36 and lead to the cylinders.

Among the many advantages of my improved valve, I may mention, of course, the simplicity of construction. As stated before, the tubes can be cast into the structure. By placing the ports as near the periphery of the sector plate as possible, I increase the distance between ports, and consequently the time necessary to move the valve from one port to another. This gives one cylinder of the gear shift mechanism more time to "bleed" into the atmosphere, before the vacuum is applied to the next one. In prior forms of similar valves, the apertures being relatively close together, a mechanical couple resulted in the slip rod lock of the gear shift, with consequent difficulties.

By providing casing 86 over the valve and ports, I permit the cylinders to "bleed" directly into this casing. If this is not done, it is necessary either to bleed directly into the open air with a resulting disagreeable noise; or it is necessary to lead off the bleeder line to some distant point, such as under the floorboard, or some other out of the way place. These difficulties I avoid by allowing the ports to open directly into this casing, which muffles the sound of inrushing air to the cylinders. There is sufficient natural leakage from the atmosphere to this chamber to provide all the air needed.

I have shown at 40 a check valve, whose detailed structure is shown in Figs. 18 and 19. It comprises an upper casing 144, a lower casing 146 held together by a bolt 148, the whole of general spherical form. The diaphragm 150 of any suitable material extends across the valve, and is held in place by the clamping together of the upper and lower halves. The diaphragm is pierced by a number of holes 152. A loose washer 154 of leather or any suitable material, rests upon diaphragm 150, and is held normally thereon by spring 161. The upper half 144 of the valve is provided with a port 156, which is connected with the manifold vacuum line 28. The lower half is provided with a port 158 which connects directly with the vacuum feed pipe 64 leading to the port 160 in the hand control valve. A spring 161 surrounds bolt 148 and presses against plate 154, and casing 144, thus tending to aid in seating plate 154 upon diaphragm 150.

This valve 40 serves a novel and useful purpose. Whenever an automobile accidentally stalls upon a hill, it has in the past resulted that the vacuum in the system would immediately be lost, and, as soon as the clutch pedal were thrown out, the gears would shift to neutral, and it would be impossible to bring any gears into mesh, until the engine was started again and the vacuum supply restored. By providing valve 40 in the manifold line, I eliminate this difficulty. As long as the engine is running, the vacuum from pipe 28 will raise element 154 thus supplying vacuum to the system. As soon, however, as the vacuum feed fails, element 154 will fall by gravity, upon diaphragm 150 and will prevent the inrush of air to the system. There will be a sufficient vacuum supply left in the system to hold the gears in position for a considerable time after the engine has stalled.

Figs. 11 to 14 show clearly the details of my improved transmission cover plate. A base plate 162 is adapted to be fixed to the transmission box by bolts registering with holes 164. These holes are placed so as to register with the holes placed in the transmission box by the manufacturer of the car, to fasten on the stock cover plate. Slip rods 166 and 168 slide longitudinally in grooves provided in the base plate. A cover plate 170 holds these slip rods snugly in place, while they abut centrally against an elevated rib 172.

Extending upwardly from each slip rod is a lug 178 which registers with slots 180 in the cover plate 170, thus permitting the aforesaid longitudinal sliding of the slip rods. Lever arms 182 and 184 pivoted at 186 and 188 on the base plate have at their inner extremities slotted heads 190 and 192 engaging the lugs 178. These lever arms are operatively connected with rods 190 and 192, which are in turn, connected to the pistons of the operating cylinders.

In Fig. 13 is illustrated conventionally, a particular type of transmission. Since, however, the gears themselves form no part of my invention, they are to be considered as illustrative only; and my invention can be applied to any type of transmission.

Shifting forks 194 are riveted or fixed at 196 at the undersides of slip rods 166 and 168, and serve to transmit motion from the slip rods to sliding gears.

Figure 14:
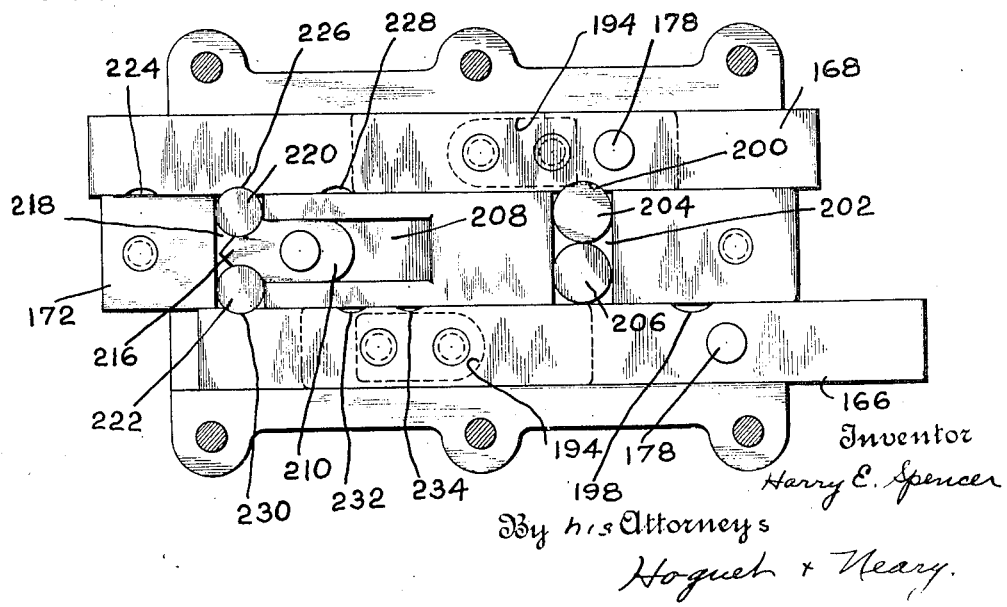
Fig. 14 is a plan view showing the slip rods and the locking mechanism.

In Figs. 13 and 14 I have shown a drift lock and a clutch lock mechanism designed to prevent untimely shifting of the gears.

I shall first describe the structure and operation of the automatic drift lock. On its inner face, slip rod 166 has a semi-cylindrical depression 198. A corresponding depression 200 is formed on the inner face of slip rod 168. These depressions are so located that when the slip rods are in the position corresponding to neutral of the gears, they will be directly opposite transverse groove 202 in bar 172. Fitting closely and slidably in this groove are two solid metallic discs 204 and 206. These locking discs are of substantially the same height as the depth of groove 202. Their diameter corresponds exactly with the length of groove 202; and the width of groove 202 and cylinder depression 198 and 200 are so proportioned that the combined diameters of the cylinders 204 and 206 are exactly equal to the width of groove 202 plus the depth of one of the depressions 198 or 200. In other words, referring to Fig. 14, these locking discs will not move to the right or left, as represented in the drawings; but are free to slide in a direction toward and away from the slip rods, and will exactly fit within the space defined by the groove 202 and the depression in either one of the slip rods.

If now, we imagine both slip rods to be in the position represented by neutral, such, by example, as shown in Fig. 11, the discs will be free to enter either one of depressions 198 or 200. If slip rod 166 were to be moved from neutral position to engage one of the gears which it controls, discs 204 and 206 will be forced upwardly (Fig. 14) and disc 204 will enter depression 200 in slip rod 168. As a result of this, it will be obviously impossible to move slip rod 168 until slip rod 166, and the gears which it controls, are returned to neutral position. Conversely, if slip rod 168 had been moved, disc 206 would have engaged with depression 198, thus immobilizing slip rod 166. In this manner, since only one slip rod can possibly be out of neutral position at one time, I effectively avoid the simultaneous meshing of two sets of possibly antagonized gears, and the probable resultant stripping thereof.

I have provided a second locking mechanism, whose purpose is to prevent the shifting of gears, except when the clutch pedal is depressed. I accomplish this in the following manner: A groove 208 is formed longitudinally in the elevated portion 172. Slidably mounted in this groove is a dagger element 210. This dagger has upon its top surface a lug 212 extending through a slot 214 in the cover plate, in a manner similar to that described for lugs 178 in the slip rods. One end of this dagger is in the form of a wedge 216. Longitudinal groove 208 terminates at one end in a transverse groove 218. Sliding in groove 218 are two metallic discs 220 and 222. These discs are similar to, but smaller than, the previously described discs 204 and 206 of the drift lock. In slip rod 168 are three semi-cylindrical depressions 224, 226 and 228. Similar depressions 230, 232 and 234 are formed on the inner face of slip rod 166. These depressions are located on the inner face of slip rods 166 and 168 in such a manner that, when the slip rods are in neutral position, depressions 226 and 232 will be opposite groove 218; groove 224 will be opposite groove 218 when slip rod 168 is moved to a position which we may, for illustration, call first speed; groove 228 will register with groove 218 when slip rod 168 is moved to a position which we may call second speed. Grooves 230 and 234 similarly register with groove 218 when slip rod 166 is in the proper position corresponding to its gear shift controls.

The dimensions of discs 220 and 222 are such that they do not completely fill the transverse dimension of groove 218. The operative end 216 of dagger 210 is adapted to enter between these discs and force them apart into the depressions which happen to register at the time with groove 218.

I provide a mechanism for automatically controlling the wedge action of dagger 210. This may best be seen in Figs. 1 and 11. A lever 236 is pivoted on the cover plate at 238. One arm 240 of this lever bears a slotted head 242, which engages lug 212 on the dagger, and is adapted to make it slide in groove 208. The other arm of lever 236 is attached by any suitable mechanism, such as 38, to the clutch pedal 244 of the automobile. Extending outward from head 242 is an auxiliary arm 246. This arm has an eye 248, in its outer extremity. A spring 250, attached to the cover plate at 252, tends constantly to pull the arm 246, and consequently head 242, lug 212, and dagger 210 to the left in Figs 1 and 11, or in the direction which will constantly tend to cause dagger 210 to wedge between discs 220 and 222. Depression of the clutch pedal, acting thru connecting element 38, will move lever 236 in a manner to counteract the pull of spring 250 and will move the dagger 210 to the right, out of engagement with the aforesaid locking discs.

The action of the clutch lock should now be clear. When the clutch is in, spring 250 will force dagger 210 between cylinders 220 and 222. These cylinders will therefore, be forced outwardly, and they will project into the depressions on the inner faces of slip rods 166 and 168, thereby locking these slip rods against longitudinal movement. When, however, the clutch pedal is depressed, the lever 236 will release the dagger from engagement with the cylinders, and, an attempt is made to move one of the slip rods, the corresponding locking disc will be pushed inwardly, out of engagement with said rod, and shifting of the gears will be possible. It will be seen therefore that this mechanism permits shifting only while the clutch is depressed. This prevents stripping of gears which often results when an attempt is made to shift without disengaging the clutch.

I have shown a cylinder, which is suitable for use in operating my gear shift. This is illustrated in detail in Figs. 15, 16 and 17. This comprises a cylindrical casing 254 with end plates 256 and 258. The assembly of these is very simple. The end plates have grooves 257, into which the casing fits. Bolts 259 with squared shanks 259a serve to hold the end plates and the casing together. Gaskets 261, may be very conveniently made by a length of soft fuse wire, placed in groove 257, sealing the connection. Fluid ports 263 are formed in the end plates.

The front end plate 258 carries a cylindrical collar 260, which is bored to carry the cylindrical rod 262 of the piston 264. The normal position of the piston 264 corresponding to neutral position of the gears, is centrally of the cylinder, as shown in Fig. 15. When the piston is moved to one end of the cylinder, the gears will be changed to one of the standard position; when the piston returns to the centre of the cylinder, the gears will be in neutral; and when the piston moves to the other end of the cylinder, the gears will be set in the second operative position controllable by said cylinder.

I provide means for the automatic positioning of the piston in the neutral position, as follows: Bolts 266 are threaded in head 258, and extend outwardly therefrom parallel with shaft 262. At their outer ends they hold a collar 268. The outer portion 270 of piston rod 262 is of a smaller diameter than that of the inner portion. This results in the formation of a flange 272. A thimble 274 is slidably mounted upon shaft 270, and is adapted to abut against flange 272 and against the outer end of sleeve 260. A stop 276 is mounted on shaft 270. A collar 278 is slidably mounted upon shaft 270, between stop 276 and thimble 274. A spring 280 surrounds shaft 270 and abuts against thimble 274 at one end, and collar 278 at the other end, and tends to push these elements apart. A cylindrical guard 282 surrounds the mechanism, while a strap 284 fastened by a bolt 286, locks element 282 in position. Guard 282 rests upon a plate or washer 283, which in turn rests upon three bosses 285 integral with the outer face of end plate 258. A central hole permits this plate to fit around thimble 260. In this manner, the mechanism is completely surrounded and protected from dirt, water and mechanical injury.

The operation of the mechanism should now be clear. If a vacuum is applied to chamber 288, of cylinder 254, piston 264 will move to the left (Fig. 15). In so doing, flange 272 will engage thimble 274, moving the same to the left and compressing spring 280. If now the vacuum is released from this chamber, spring 280 will extend against thimble 274 and flange 272, and will push the piston to the right until thimble 274 abuts against collar 260, when the mechanism will come to rest. It will then be exactly in neutral position. Similarly, if vacuum is applied to chamber 290 the mechanism will move to the right; stop 276 will bear against collar 278, thereby compressing spring 280. When the vacuum is released, spring 280 will push collar 278 against stop 276, moving the piston rod and piston to the left to neutral position, when further movement will be stopped by collar 278 abutting against fixed collar 268.

For convenience of assembly, I may make bolts 266 with squared shanks 292, which may register with corresponding square holes in collar 268. After applying plate 283 and casing 282, and mounting thimble 274, spring 280, and collar 278 upon the shaft, collar 268 may be pushed inwardly, thus releasing it from engagement with bolts 266. These may then be tightened down to the proper degree and spring 280 may then be allowed to expand against thimble 278 and collar 268, thus holding it in locking engagement with the squared shanks of the bolts. Strap 284 may then be applied and the structure is completely assembled.

Fig. 1A which is an extension of Fig. 1, illustrates a pair of cylinders, with connecting rods 190 and 192 for operation of the slip rods; and with vacuum lead lines 30, 32, 34, 36, each line feeding into one end of one cylinder. The cylinders may be mounted on any convenient support, 292, which may be any convenient part of the chassis of the car.

I claim:

1. A pneumatic gear shift controlling valve, comprising a flat base plate of sector shape, widely spaced fluid pressure distributing ports in said base plate, and adjacent the periphery thereof, a fluid pressure feeding port in said base plate, a valve element slidably mounted upon said base plate in air-tight relation therewith, said valve element comprising a circular portion and a finger extending therefrom, a groove on one face extending around said circle and out into said finger, the circular portion of said groove being in constant registry with said fluid pressure feeding means, and manually operable means for moving said valve element that the groove in the finger thereof may selectively register with one of said fluid distributing ports.

2. A pneumatic gear shift controlling valve, comprising a flat base plate of sector shape, spaced fluid pressure distributing ports in said base plate adjacent the periphery thereof and normally open to the atmosphere, a fluid pressure feeding port in said base plate, a valve element slidably mounted upon said base plate, resilient means for holding said valve element in air-tight relation with said base plate, said valve element comprising a circular portion and a finger extending therefrom, a groove on one face of said valve element extending around said circular portion and out into said finger, the circular portion of said groove being in constant registry with said fluid pressure feeding port, and means for moving said valve element to bring the groove in the finger thereof into selective registry with individual fluid distributing ports.

In testimony whereof, I have signed my name to this specification this 6th day of Feb., 1929.

HARRY E. SPENCER.